United States Patent [19]

Joyce et al.

[11] Patent Number: 5,228,910

[45] Date of Patent: Jul. 20, 1993

[54] MIXED METAL OXIDE CRYSTALLINE POWDERS AND METHOD FOR THE SYNTHESIS THEREOF

[75] Inventors: Ivan H. Joyce, Hudson; Robert P. Blonski, North Royalton; John J. Maloney, Solon; John J. Welch, Cleveland; Richard A. Pipoly, Garfield Heights; Christine J. Byrne, Olmsted Township, Cleveland County, all of Ohio

[73] Assignee: Ferro Corporation, Cleveland, Ohio

[21] Appl. No.: 756,158

[22] Filed: Sep. 6, 1991

[51] Int. Cl.$^5$ .............................................. C08K 3/00
[52] U.S. Cl. .................................. 106/450; 501/106; 501/120; 501/121
[58] Field of Search ....................... 501/106, 120, 121; 106/18.3, 18.31, 419, 450, 456; 505/729

[56] References Cited

U.S. PATENT DOCUMENTS

| | | | |
|---|---|---|---|
| 2,920,971 | 1/1960 | Stookey | 106/39 |
| 3,022,185 | 2/1962 | Delfosse | 106/296 |
| 3,022,186 | 2/1962 | Hund | 106/300 |
| 3,252,852 | 5/1966 | Lagally | 162/169 |
| 3,560,234 | 2/1971 | Holbein | 106/300 |
| 3,607,338 | 9/1971 | Webb et al. | 106/292 |
| 3,658,566 | 4/1972 | Sheehan et al. | 106/300 |
| 3,661,610 | 5/1972 | Ferris | 106/306 |
| 3,704,158 | 11/1972 | Rohan | 117/100 |
| 3,915,661 | 10/1975 | Vichr | 423/594 |
| 3,920,800 | 11/1975 | Harris | 423/432 |
| 4,196,004 | 4/1980 | Berretz | 106/48 |
| 4,199,370 | 4/1980 | Brand | 106/300 |
| 4,224,627 | 9/1980 | Powell et al. | 346/75 |
| 4,227,935 | 10/1980 | Blake et al. | 106/308 |
| 4,310,357 | 1/1982 | Matsuura et al. | 501/15 |
| 4,365,021 | 12/1982 | Pirooz | 501/15 |
| 4,448,608 | 5/1984 | Jenkins et al. | 106/292 |
| 4,522,925 | 6/1985 | Pirooz | 501/15 |
| 4,752,341 | 6/1988 | Rock | 106/300 |
| 4,767,464 | 8/1988 | Strauch et al. | 106/464 |
| 4,829,031 | 5/1989 | Roy et al. | 501/120 |
| 4,882,301 | 11/1989 | Gettys et al. | 501/17 |
| 4,917,735 | 4/1990 | Rademachers | 106/428 |

FOREIGN PATENT DOCUMENTS

0172764 7/1985 European Pat. Off. .

OTHER PUBLICATIONS

DCMA—"Classification and Chemical Description of the Complex Inorganic Color Pigments", Third Edition, 1991, Dry Color Manufacturer's Association.

"Alpha Alumina Transformation in Seeded Boehmite Gels" by R. Shelleman et al, Journal of Non-Crystalline Solids 82, 1986, pp. 277-285 (Exhibit D).

(List continued on next page.)

*Primary Examiner*—Mark L. Bell
*Assistant Examiner*—Paul Marcantoni
*Attorney, Agent, or Firm*—Renner, Kenner, Greive, Bobak, Taylor & Weber

[57] ABSTRACT

A method for the synthesis of mixed metal oxide crystalline powders comprises the steps of preparing a raw material mixture containing at least two different metal cations; adding a template material to the mixture and blending it therewith; initiating formation of a mixed metal oxide by calcination of the mixture and the template material, whereby particles of the mixed metal oxides are formed; and thereafter recovering the mixed metal oxide particles. Mixed metal oxide crystalline powders comprise a template material; and metal oxides which form pigment classes of material containing the template material, the pigment classes being selected from the group consisting of borate, garnet, olivine, phenacite, phosphate, priderite, pyrochlore, sphene, spinel and zircon, as well as perovskite crystal classes of material containing the template, all of which have a uniform particle morphology and particle size ranging between about 0.2 to 100$\mu$ with minimal comminution.

10 Claims, 6 Drawing Sheets

OTHER PUBLICATIONS

McPherson et al, "The Reassociation of Plasma Disassociated Zircon", *Journal of Material Science*, 20, pp. 2597-2602, 1985.

Kobayaski et al, "Preparation of $ZrSiO_4$ Powder Using Sol-Gel Process (I)—Influence of Starting Materials and Seeding" *Journal of the Ceramic Society of Japan, Int. Ed.*, vol. 97 pp. 578-582 (Jun. 1990).

*The Major Ternary Structural Families* written by O. Muller and R. Roy, pp. 1-12, and p. 147.

Messing et al, "Seeded Transformations for Microstructural Control in Ceramics", Chapter 28, pp. 259-271, *Science of Ceramic Chemical Processing*, Wiley-Interscience, (1986), Hench and Ulrich Editors.

Messing et al, "Controlled Chemical Nucleation of Alpha Alumina Transformation", *Science of Ceramics*, 14, pp. 101-106, (1988).

W. R. Blevin and W. J. Brown, "Light-Scattering Properties of Pigment Suspensions", *Journal of the Optical Society of America*, vol. 51, No. 9, Sep. 1961.

P. Kresse, "Influence of the particle size and particle form of inorganic pigments on change of shade in coloured paints and lacquers", *Journal of the Oil Color Chemists Association*, vol. 49, 1966.

"Transformation and Microstructure Control in Bochmite-Derived Alumina by Ferrie Oxide Seeding", *Advanced Ceramic Materials*, 3[4]387-92 (1988) McArdle et al.

"Formation of the High $T_c$ Phase of $Bi_{1-x}Pb_xSr_{0.90}Ca_{1.10}Cu_{1.50}O_y$ ($O \leq X \leq 0.05$)" *Japanese Journal of Applied Physics*, vol. 28, No. 9, pp. 1518-1520 (1989) by Iwai et al.

FIG. IA
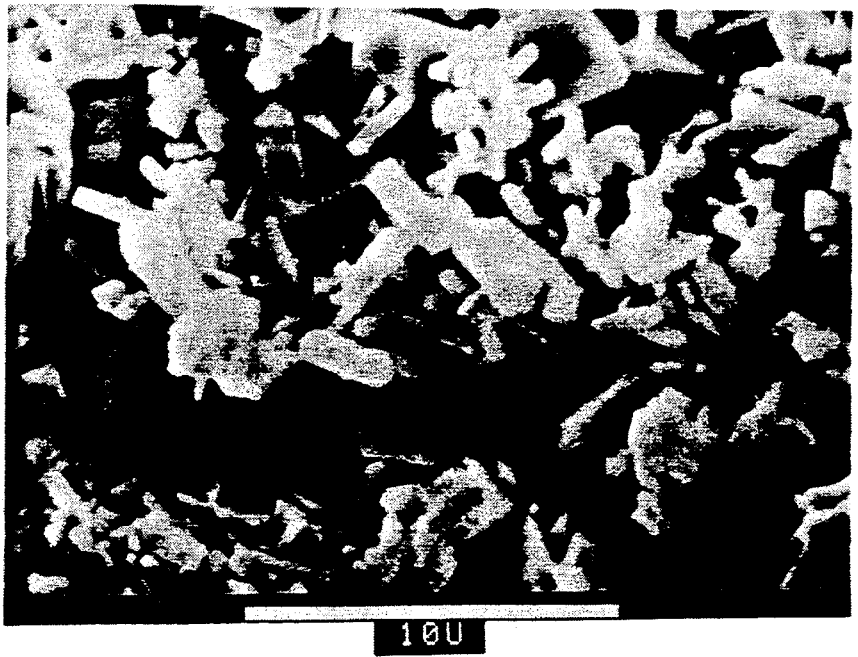
FIG. IB

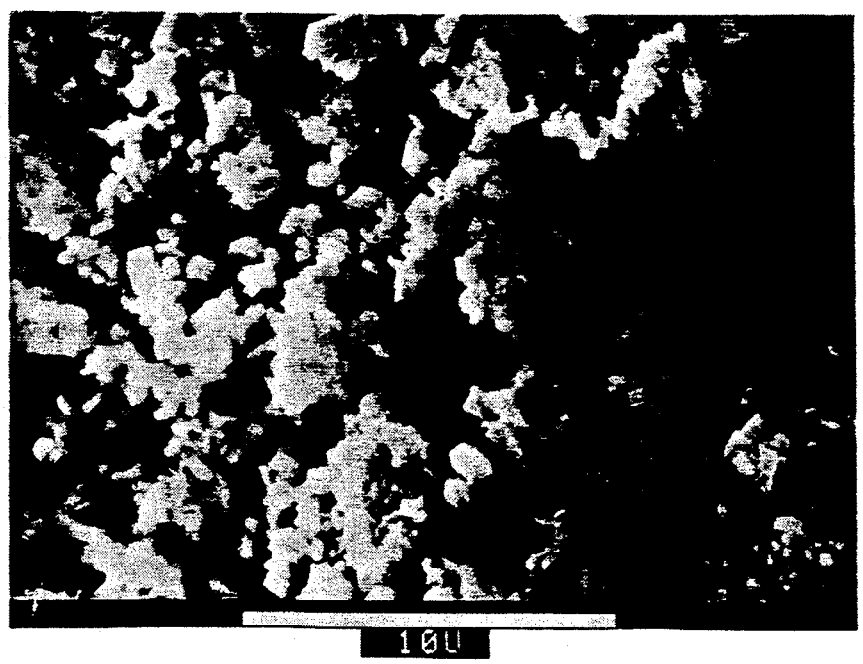
FIG. IC
FIG. 2A

MIXED METAL OXIDE CRYSTALLINE POWDERS AND METHOD FOR THE SYNTHESIS THEREOF

TECHNICAL FIELD

The present invention relates to a method of producing crystalline powders of mixed metal oxide powders having improved properties. More particularly, the crystalline powders are derived from at least two materials. They are useful in a variety of applications including, for instance, as pigments for use in ceramics, paints and plastics as well as uses in superconductors, semiconductors, ferroelectrics, dielectrics, piezoelectrics, refractories, catalysts, grinding media, abrasives and the like.

BACKGROUND ART

There are several structural groupings that are important in inorganic non-metallic technology. Many are widely used in such diverse applications as refractories, as ferroelectric devices, as inorganic pigments and the like. These compounds are typically mixed metal oxides although they may also contain sulfur, carbon or the halogen elements. Of particular interest is the use of mixed metal oxides as inorganic pigments for ceramics, paints and plastics. Typically, in the pigment industry, classes of pigments that are well recognized are described in a publication of the Dry Color Manufacturers Association, discussed in greater detail hereinbelow. For these uses, it is desirable to produce pigment particles with very small uniform particle sizes, which are phase pure and defect free.

Typically, mixed metal oxide inorganic pigments are commercially, although not exclusively, produced by either a) a solid state reaction process involving the wet or dry blending of various metals, oxides or salts, subsequent calcination at elevated temperatures, to ensure that the desired reaction occurs, followed by comminution (or deagglomeration) to the desired size and washing and drying (if required, to remove unwanted salts) or b) chemical precipitation which may be followed by calcination and subsequent grinding (or deagglomeration) to the desired size and washing and drying (if required to remove unwanted salts), or c) combinations of both processes.

Modern practice attempts to maximize dry process options in the interests of economy and energy efficiency by batching and dry blending raw materials prior to calcination. The raw materials used are fine powders typically with particle sizes in the range of 0.2 to $50\mu$. It is normally not the purpose of the dry blending process to reduce the particle sizes of the constituent powders, but seeks to distribute them evenly. However, dry blending cannot generally produce raw batches that are homogeneous on a submicron scale. The calcinations are typically 0.1 to 24 hours in length to allow for large scale production; however, this is often insufficient to permit complete diffusion of the active species and reaction of the coarser or more refractory raw materials. Calcination can be achieved in periodic, intermittent kilns, or continuous rotary or tunnel kilns. Final size adjustment is achieved by either wet or dry comminution devices which might include, ball milling, attrition milling, micropulverization or jet milling. Wet comminution is followed by a drying operation or, a filter, wash and drying operation.

The typical pigment manufacturing process described above causes a number of significant problems for the production of high quality pigments. Some common difficulties are: achieving complete reaction; production of a single phase product; production of fine sized particles; production of narrow particle size distributions; formation of aggregates and large particles which are difficult or impossible to mill down to the desired size; and, elimination of grit and large particles ($>2\mu$ or $>10\mu$, depending on the pigment application).

It is also common practice in the pigment industry particularly in the case of zircon pigments to assist the high temperature reactions by the use of salts, (sometimes called fluxes or mineralizers) which melt, form eutectics or a reactive vapor phase which is conducive to the mutual migration or diffusion of the active species. Their use is largely based on experience because generally there is no reliable manner of predicting which particular mineralizer or combination will enhance the formation of a given color, or amount thereof. Mineralizers are typically employed to enhance liquid phase formation, eutectic melt systems and vapor phase reactions. Such mineralizers are typically fluorides, chlorides, sulfates, oxides and other salts which might be used singly or in multiple combinations. Depending upon the application of the pigment it is frequently necessary to wash the finished pigment to remove residual salts or mineralizers.

The art and literature demonstrate the desirability of obtaining and employing small, uniform particle sizes for pigment applications as well as techniques involving precursors and seeding in order to provide improved particles and/or properties.

The importance of a pigment's particle size with respect to its optical performance is discussed, for example, by W. R. Blevin and W. J. Brown in an article entitled "Light-Scattering Properties of Pigment Suspensions", *Journal of the Optical Society of America*, Vol. 51, No. 9, September 1961. The overall importance of the particle size of a material with respect to its interaction with electromagnetic radiation can be found in the book written by C. F. Bohren and D. R. Huffman entitled *Absorption and Scattering of Light by Small Particles*, John Wiley & Sons, 1983. The importance of the pigment's particle size and shape to the rheological performance of the pigment in liquid systems is discussed, for example, by P. Kresse in an article entitled "Influence of the particle size and particle form of inorganic pigments on change of shade in coloured paints and lacquers", *Journal of the Oil Color Chemists Association*, Vol. 49, 1966.

U.S. Pat. No. 4,752,341, for instance, describes a pigment system for paper which employs zeolite and $TiO_2$. To aid the paper making process, the patent teaches the use of zeolite having an average particle size of less than $3\mu$ and a crystallite size of less than $1\mu$. If the particle and crystal size are much larger, the quality of the paper is reduced. While recognizing this necessity, the patent does not provide a means for manufacturing small particle and crystal sizes.

U.S. Pat. No. 4,767,464 is directed toward carbonate-containing mineral materials, such as chalk, limestone, marble, synthetic $CaCO_3$ and dolomite. Such materials have several uses, including pigments, and preferably have a small mean particle diameter of 0.5 to $2.5\mu$, obtained by dry grinding.

U.S. Pat. No. 4,882,301, owned by the Assignee of record, is directed toward glass enamel systems designed to be fused onto a glass substrate at temperatures of between 1000° F. (538° C.) and 1350° F. (732° C.). The glass fraction of the system is a lead borosilicate glass. A feature of the glass enamel system is the presence of a crystallizing amount of a precursor of cadmium or zinc orthosilicate and/or cadmium or zinc metasilicate. The crystallizing amount of the precursor is that amount sufficient to produce crystallized cadmium silicate upon firing to harden the melt of glass enamel. These systems ultimately contain inorganic pigments or opacifiers to impart a desired black or dark gray band on glass employed on automobiles.

The use of alpha alumina seed crystals to lower the transition temperature of a sol-gel derived boehmite powder and to control the sintering of a ceramic body made from this mixture is described by Messing et al in "Seeded Transformations for Microstructural Control in Ceramics", Chapter 28, pp 259-271, *Science of Ceramic Chemical Processing*, Wiley-Interscience, 1986, Hench and Ulrich Editors. This method for the preparation of sintered ceramic bodies is covered by European patent 172764. The use of alpha-Iron (Hematite), which is isostructural to alpha-alumina as a seed crystal instead of alpha-alumina is discussed by Messing et al in "Controlled Chemical Nucleation of Alpha Alumina Transformation", *Science of Ceramics*, 14, pp 101-106, 1988 and in "Transformation and Microstructure Control in Boehmite-Derived Alumina by Ferric Oxide Seeding", *Advanced Ceramic Materials*, Volume 3, Number 4, pp 387-392, 1988.

The use of zircon particles to increase the rate of the reassociation of plasma dissociated zircon is described by McPherson et al in "The Reassociation of Plasma Dissociated Zircon", *Journal of Material Science*, 20, pp 2597-2602, 1985. It should be noted that the plasma dissociation process breaks down the zircon crystal into ultra-fine ($<0.1\mu$) zirconia particles and an amorphous Silica glass.

Finally, a preparation of zircon powder is described in an article by Kobayaski et al entitled "Preparation of $ZrSiO_4$ Powder Using Sol-Gel Process (1)—Influence of Starting Materials and Seeding" *Journal of the Ceramic Society of Japan, Int. Ed.*, Vol. 98 (June 1990). More particularly, the authors investigated the effect of temperature, heating rate and the addition of $ZrSiO_4$ seed crystals on preparation by the sol-gel process to obtain high purity zircon powder. Generally, they found that seeding allowed the initiation temperature of zircon formation during calcination to be lowered by about 212° F. (100° C.) to 2192° F. (1200° C.). When calcination was then increased from 2912° F. (1600° C.) to 3002° F. (1650° C.), an almost pure, single phase zircon powder was obtained.

Typical commercial pigments are produced by mixing raw materials in the form of oxides, carbonates, hydroxides, hydrates, oxalates or the like, in wet or dry form, and then firing the mix at high temperatures in furnaces of varying construction and means of material transport. Two common methods are to load the mixed material into large crucibles, known in the industry as saggers, and fire them either stationary or on a moving slab or, to fire the material by feeding the material into a rotating tube furnace. It is difficult in either of these solid state processes to synthesize a material that is well crystallized, phase pure, with a controlled, fine particle size which has a narrow particle size distribution. The situation is even more difficult when one considers the economics of the situation. Typically the optimum particle size of the pigment is smaller than the particle size of commercially viable raw materials. It is extremely difficult to form high quality ultra-fine particles out of typical, commercially available, inexpensive larger raw materials. The material typically produced with the above processes and raw materials must often go through extensive grinding operations to reduce their size to the proper value without the use of ultrafine raw materials. Also, the very act of extensive grinding produces broad particle size distributions, which can be disadvantageous.

None of the foregoing technology describes a method for obtaining small and uniform particle sizes and shapes of mixed metal oxide powders from a solid state reaction. Such a method would have significant advantages over current technology which requires that relatively "large" crystals be ground to desired size after manufacture and introduces the possibility of contamination by the grinding media. Not only is grinding an additional step, adding to the cost, but the quality of the product may suffer. Growth of a small crystal would also allow the crystalline structure to remain intact and impart greater stability with respect to weatherability, resistance to attack with the suspending media, e.g., ceramics, glass, plastics, paints and the like.

DISCLOSURE OF THE INVENTION

It is therefore an object of the present invention to provide a method for the manufacture of mixed metal oxide crystalline powders having reduced particle size and improved particle structure.

It is yet another object of the present invention to provide a method for the manufacture of mixed metal oxide crystalline powders having a narrow or controlled distribution of particle sizes and less crystalline surface imperfections.

It is yet another object of the present invention to provide a method for the manufacture of mixed metal oxide crystalline powders that have smaller average particle sizes, requiring less or milder grinding to produce finished particle sizes.

It is yet another object of the present invention to provide a method for the manufacture of mixed metal oxide crystalline powders that provides for a more pure morphological phase of product and the ability to produce a desired, tuned morphology.

It is another object of the present invention to provide a method for the manufacture of mixed metal oxide crystalline powders that provides more perfect crystals and crystal faces and concurrently, less defects.

It is yet another object of the present invention to provide a method which allows the manufacture of mixed metal oxide crystalline powders having phases and/or crystalline structures not readily available employing conventional techniques and conventional raw materials.

It is still another object of the present invention to provide a method which allows the manufacture of mixed metal oxide crystalline powders providing a more complete reaction.

It is yet another object of the present invention to provide a method for the manufacture of mixed metal oxide crystalline powders utilizing larger, relatively inexpensive raw materials rather than ultrafine materials.

It is yet another object of the present invention to provide a method for the manufacture of mixed metal oxide crystalline powders requiring lower reaction temperatures.

It is another object of the present invention to provide a method for the manufacture of mixed metal oxide crystalline powders for use as pigments that have improved color strength.

It is yet another object of the present invention to provide a method for the manufacture of mixed metal oxide crystalline powders having utility as superconductors, ferroelectrics, dielectrics, piezoelectrics, refractories, catalysts, grinding media, abrasives and the like.

It is still another object of the present invention to provide mixed metal oxide crystalline powders having improved crystalline structure, controlled particle size and narrow particle size distributions.

It is still another object of the present invention to provide mixed metal oxide crystalline powders having improved crystalline structure, that are more phase pure and which contain less aggregation, inter-particle necking and particle fusion.

It is yet another object of the present invention to provide mixed metal oxide pigments having improved crystalline structure, controlled particle size and narrow particle size distributions.

It is yet another object of the present invention to provide mixed metal oxide pigments that offer one or more of the following properties including improved color strength, higher quality, better stability with respect to weathering and, resistance to reaction with suspending media.

It is yet another object of the present invention to provide mixed metal oxide pigments that have a wider firing range for use in ceramics.

At least one or more of the foregoing objects, together with the advantages thereof over known methods and mixed metal oxide pigments and crystalline powders, which shall become apparent from the specification which follows, are accomplished by the invention as hereinafter described and claimed.

In general, the present invention provides a method for the synthesis of mixed metal oxide crystalline powders which comprises the steps of preparing a raw material mixture containing at least two different metal cations; adding a template material to the mixture and blending it therewith; initiating formation of a mixed metal oxide powder by calcination of the mixture and the template material, whereby particles of the mixed metal oxides are formed; and thereafter recovering the mixed metal oxide particles.

The present invention also provides mixed metal oxide crystalline powders comprising a template material; and metal oxides which form pigment classes of material containing the template material; the pigment classes being selected from the group consisting of borate, garnet, olivine, phenacite, phosphate, priderite, pyrochlore, sphene, spinel and zircon, as well as perovskite crystal classes of material containing the template, all of which have a uniform particle morphology and particle size ranging between about 0.2 to 100μ with minimal comminution.

The present method of the invention is applicable to either wet or dry process pigments in that its action is aimed at improving the solid state reactions which take place during the calcination stage regardless of the wet or dry blending process or washing steps which may be used prior or subsequent to calcination respectively.

BRIEF DESCRIPTION OF THE DRAWINGS

FIG. 1A is a scanning electron microscope photomicrograph, at 5,000 magnification, depicting a zirconium praseodymium silicate powder, made in a conventional manner;

FIG. 1B is a scanning electron microscope photomicrograph, at 5,000 magnification, depicting a zirconium praseodymium silicate powder, made according to the method of the present invention;

FIG. 1C is a scanning electron microscope photomicrograph, at 5,000 magnification, depicting a zirconium praseodymium silicate powder, made according to the method of the present invention;

FIG. 2A is a scanning electron microscope photomicrograph, at 10,000 magnification, depicting a copper chrome black spinel structure made in a conventional manner;

PREFERRED EMBODIMENT FOR CARRYING OUT THE INVENTION

Figure 2B:
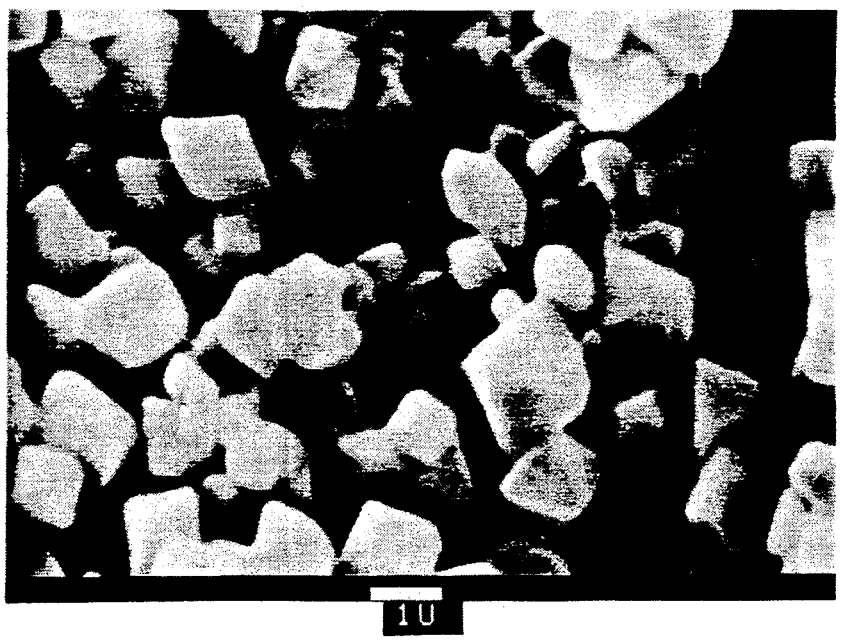
FIGS. 2B, 2C, 2D, 2E and 2G are scanning electron microscope photomicrographs, at 10,000 magnification, illustrating the use of a finely divided spinel-structured template material in varying amounts and different calcination procedures to produce copper chrome black spinel structures according to the method of the present invention.
Figure 2C:
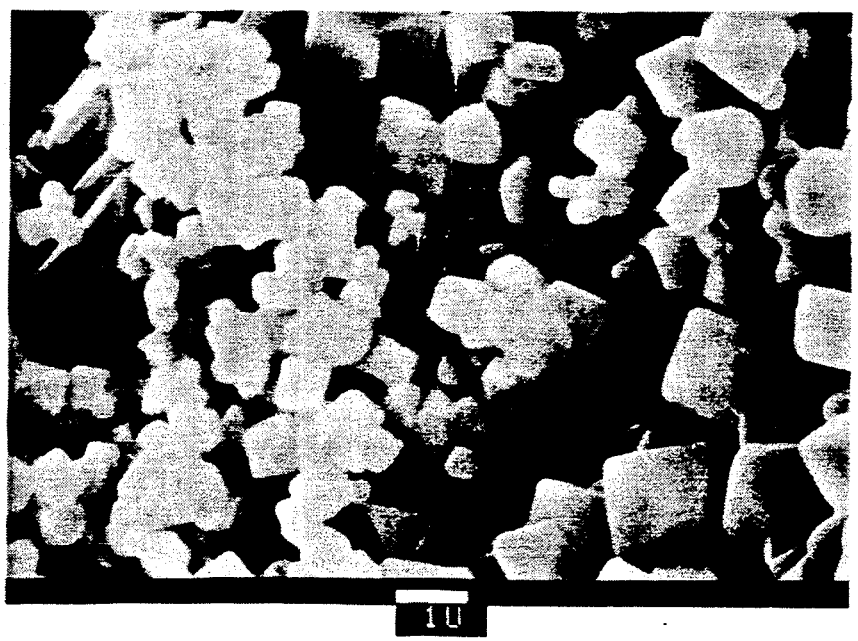
Figure 2D:
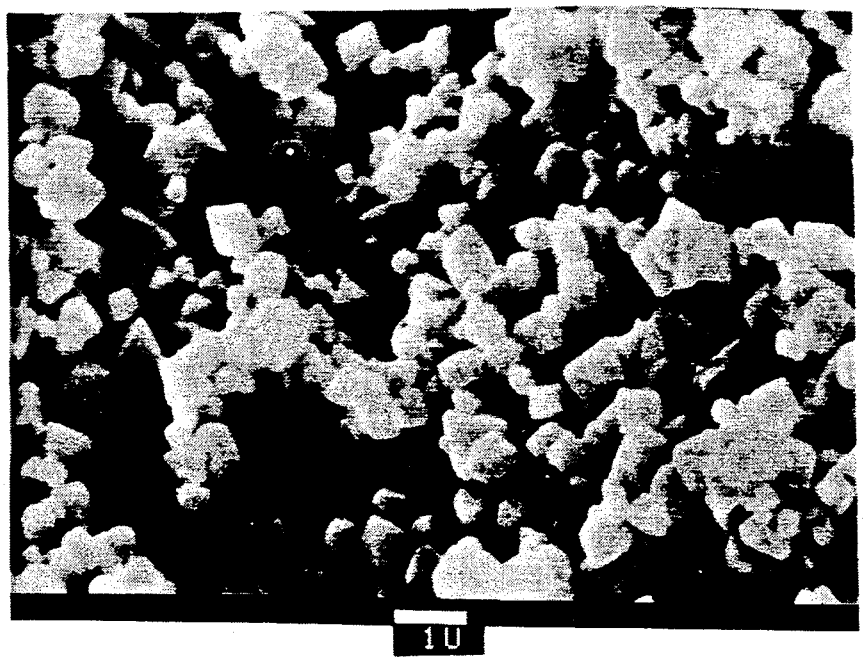

Practice of the present invention is primarily directed toward producing improved inorganic pigments, three examples of which are exemplified herein. Also metastable, high temperature or other crystalline phases that are difficult to synthesize under standard pigment manufacturing processes may be made via the method of the present invention. Nevertheless, the method is not limited solely to the production of powders having utility as pigments, but is also useful for the production of improved crystalline structure powders of controlled size for other industrial applications.

As noted hereinabove, this invention is primarily directed toward the production of mixed metal oxide crystalline structures and in particular, pigments and perovskites. Novelty does not reside in the various chemical components but rather in the ability to control the solid state synthesis of the particles. A good disclosure of the types of mixed metal oxide materials that can be synthesized and are useful as pigments is available in the *DCMA Classification and Chemical Description of the Mixed Metal Oxide Inorganic Colored Pigments*, sec. ed. published by the Dry Color Manufacturers Association, January 1982) the subject matter of which is incorporated herein by reference. In particular, the method can be employed with the following DCMA pigment classes:

| | |
|---|---|
| Olivine | Phenacite |
| Priderite | Sphene |
| Spinel | Zircon |
| Borate | Garnet |
| Phosphate | Pyrochlore |

The method may not be applicable to other DCMA classes, for instance, where no cation ordering is necessary or when a dopant simply substitutes for a host cation in the structure of the host, particle size and structure would not be improved.

The crystalline powders of the present invention can also include ternary structures for compounds having such stoichiometries as $A_2BX_4$, $ABX_4$ and $ABX_3$, where A and B are cations and X is an anion. For a more complete description of such compounds, see *The Major Ternary Structural Families* by O. Muller and R. Roy, (1974), the subject matter of which is incorporated herein by reference.

In conventional solid state production of inorganic pigments, a combination of selected metal oxides are mixed together to form a raw material mixture and then fired in a standard refractory sagger, kiln or other suitable device to produce an inorganic pigment. Such products typically have large particle sizes, on the order of over $10\mu$, which must then be milled or ground to a size of about $5\mu$ for use in ceramics, or finer for use in paints and plastics. It is important to note that the method of the present invention is not a sol-gel process. The latter requires costly raw materials and provides powders via precipitation. Moreover, grinding and milling of the dried or calcined product may still be required.

Achieving complete reaction in the formation of a pigment is extremely important. Any unreacted materials or byproducts will likely exhibit a different color which may make the product look duller. To prevent the presence of color contaminating species in the product, some pigments are grossly overfired, and must then be extensively ground to achieve an appropriate particle size. Others contain an excess of one of the raw materials, usually one that is white, to force complete reaction of a color contaminating material. The present invention helps significantly in eliminating or minimizing these problems.

The method of the present invention employs a template in the synthesis of the mixed metal oxide powder. The template regulates the resultant crystal structure, the particle size, and/or the particle shape (morphology), of the product made by the solid state reaction of two or more ionic species to form the desired mixed metal oxide powder. The effect of the template addition is a function of the template concentration and the particle size of the template. The template generally is of the same crystal structure as the desired product, or of a closely related crystal structure. The template can also be previously prepared product, as demonstrated in the examples hereinbelow.

Thus, a zircon is the preferred template for zircon crystal production; a sphene is the preferred template for a sphene crystal structure, and so forth. The size of the template can be very small, about 0.01 to $0.5\mu$, very large 5 to $50\mu$, or anywhere in between, depending on the system and the desired results. The template may also be formed "in situ", as a calcination product of a precursor.

Materials useful as templates in specific crystal systems include zircon ($ZrSiO_4$) for use in zircons, black iron oxide ($Fe_3O_4$), magnesium aluminate spinel ($MgAl_2O_4$) for use in spinels, finished pigments themselves, such as F-6331, a finely divided spinel-structured pigment manufactured by the Assignee of record herein also for use in spinels, other finished pigments of suitable size and crystal structures or suitable materials of the correct crystal system.

The template is added to the raw material mixture in amounts of at least about 0.002 to 0.1 percent by weight up to about 20 percent by weight, with a range of between about 0.1 to 5 percent by weight being preferred. Generally, the upper limit can be lesser or greater, and is controlled by the size of the template particle.

By addition of the template, average particle sizes of the mixed metal oxide powder after firing are controlled significantly within a range of $0.1\mu$ up to $50\mu$ depending on the crystal system, mean diameter by volume (MV), and application. Preferably, particle sizes for use in paints and plastics should have a range of 0.1 to $3\mu$.

Following additions of the template to the raw material mixture, with complete mixing, the mixture is then fired in a conventional manner using intermittent or continuous kilns.

Initiation of the mixed metal oxide powder formation is conducted by calcining at a temperature of from about 500° F. (266° C.) to about 2500° F. (1343° C.) for about 0.1 to 24 hours. Thus, as an advantage, use of the template material according to the present invention allows the initial firing temperature to be lowered by up to about 270° F. (150° C.), depending on the pigment system, and typically between about 50° F. (28° C.) to 150° F. (84° C.), which represents a savings of energy and of processing time. Following manufacture, the mixed metal oxide powder is recovered from the crucible, or other apparatus, and often requires minimal or no additional processing, such as grinding or a much lower energy deagglomeration technique.

In order to demonstrate practice of the present invention the manufacture of a zircon structure, a spinel structure and a phenacite structure is reported hereinbelow.

ZIRCON PRASEODYMIUM SILICATE YELLOW EXAMPLES

A raw batch material mixture was prepared having the following composition:

| Weight % | Material |
|---|---|
| 59 | Zirconium Oxide |
| 29 | Silicon Dioxide |
| 4 | Praseodymium Oxide |
| 3 | Barium Fluoride |
| 2 | Potassium Chloride |
| 3 | Ammonium Chloride |

Components were mixed in a blender, following which four 6.4 Kg samples were taken.

Template materials were added to three of these samples as denoted in Table I. Amounts of template materials have been provided in weight percent and were made over and above the other ingredients. A fourth sample, Example No. 1, was not provided with any template material and served as a control. All of the samples were blended in a Henschel mixer for 5 minutes at 3400 RPM and then placed in standard covered refractory saggers. The samples were taken from room temperature to 1750° F. (954° C.) at a rate of 6° F. (3.3° C.) degrees per minute and then held at that temperature for 6 hours. The samples were then furnace cooled to room temperature.

Also included in Table I are the particle sizes of the products as measured on a Leeds and Northrup Microtrac Particle Size Analyzer. Although this is a measure of particle agglomerate size and not actual individual particle sizes, it is typically used in industry to monitor the general size of a powder.

TABLE I

Zircon Praseodymium Silicate Yellow Powder

| FIG. | Example No. | Template | Average Particle Size (MV) |
|---|---|---|---|
| 1A | 1 | No addition | 9.9μ |
| 1B | 2 | 7.1% Pigment[a] | 5.3μ |
|    | 3 | 14.3% Pigment[a] | 5.0μ |
| 1C | 4 | 3.6% Zirconium Silicate[b] | 3.2μ |

[a]Ferro Zirconium Praseodymium Silicate pigment
[b]MV = 1.09μ

With reference to the SEM photomicrographs, the structure and size of Example 1 is shown in FIG. 1A; of Example 2 in FIG. 1B and of Example 4 in FIG. 1C. The similarity of the shape of the final product to the template is also demonstrated since the shape of the pigment template for Examples 2 and 3 is rodlike while that of the zirconium silicate template (Example 4) is blocky. Use in Example 3 of more than 10% template material led to bimodal particle size distribution.

Next, a laboratory crucible study was conducted using the same raw material mixture discussed hereinabove. For this study, different template materials were employed including two different particle size zirconium silicates (MV=1.09μ) and (MV=3.22μ) and the finished products from Example Nos. 2 and 4. The additions were tested at 0.1%, 0.5%, and 1%. This amounted to adding 0.03, 0.15, and 0.3 grams to a 30 gram batch. These samples were blended for about one minute in a Waring blender, placed into porcelain crucibles and fired, covered in a small electric kiln, with the same firing schedule as above. Particle size data is reported in Table II, hereinbelow. Amounts are stated in weight percent.

TABLE II

Microtrac Particle Size Data (μMV)

| Example No. | Template/Amount | 0.1% | 0.5% | 1.0% |
|---|---|---|---|---|
| 5 | Zirconium Silicate (1) | 4.13 | 2.83 | 2.66 |
| 6 | Zirconium Silicate (2) | 4.14 | 3.24 | 3.05 |
| 7 | Ex. No. 4 | 4.32 | 4.04 | 3.49 |
| 8 | Ex. No. 2 | 5.14 | 5.09 | 4.73 |

(1) Particle size MV = 1.09μ
(2) Particle size MV = 3.22μ

It should be noted that the normal particle size for this formulation and firing condition is typically in the range of 7 to 10μ. From Table I, it is evident that the use of a template material has a significant effect on decreasing the size over the control, Example No. 1, where none was employed. In Table II, it is seen that lower particle sizes were obtained as the amount of template addition increased from 0.1 to 1.0 weight percent.

Even before measuring the particle size of the zirconium praseodymium silicate yellow powder, it was observed that the product was considerably fluffier than conventionally produced powders, indicating a finer particle size. The samples were also considerably lighter in color than the control particles (Example No. 1) which again, indicated a smaller sized particle.

COPPER CHROME BLACK EXAMPLES

A spinel structured copper chrome black pigment having a composition of approximately 36 percent by weight cupric oxide and 64 percent by weight green chromium oxide was prepared by dry mixing these oxides in a Waring Blender for one minute. The resulting mixture was then heated in a electric oven to 1550° F. (843° C.) over a seven hour period, and held there for four hours. A scanning electron photomicrograph, SEM, of this calcined material is shown in FIG. 2A. This sample is labelled Example No. 9.

Template materials, including a finely divided spinel-structured pigment (Ferro F-6331 pigment), a ground black iron oxide spinel pigment ($Fe_3O_4$), and a ground corundum-structured pigment ($Fe_2O_3$) were added to separate samples of the copper chromium oxide mixture and suitably blended. Amounts of each addition by percent, based on the weight of the raw material batch, and the type of structure are reported in Table III hereinbelow. For comparison, no template material was added to Example No. 9, which serves as a control. All of the above samples were fired as described for Example No. 9. The average particle sizes (MV) of the fired examples described above were measured using a Leeds and Northrup Microtrac particle size analyzer. These values are reported in Table III.

TABLE III

Copper Chrome Black Powder

| FIG. No. | Example No. | Template | Crystal form of Template | Microtrac MV |
|---|---|---|---|---|
| 2A | 9 | NONE | NONE | 6.20 |
| 2B | 10 | 0.25% F6331[a] | spinel | 3.32 |
| 2C | 11 | 2.0% F6331[a] | spinel | 2.56 |
| 3B |   |   |   |   |
| 2D | 12 | 5.0% F6331[a] | spinel | 2.38 |
| 2E | 13 | 2.0% $Fe_3O_4$ | spinel | 3.99 |
| 2F | 14 | 2.0% $Fe_2O_3$ | corundum | 6.01 |
| 2G | 15 | 5.0% F6331[a] | spinel | 1.95 |

[a]Ferro FeMnCu spinel pigment

As is again evident from the particle sizes reported in Table III, the addition of a correct template material resulted in a reduction in average particle size, as compared to the control, in all instances except Example No. 14.

Figure 2E:
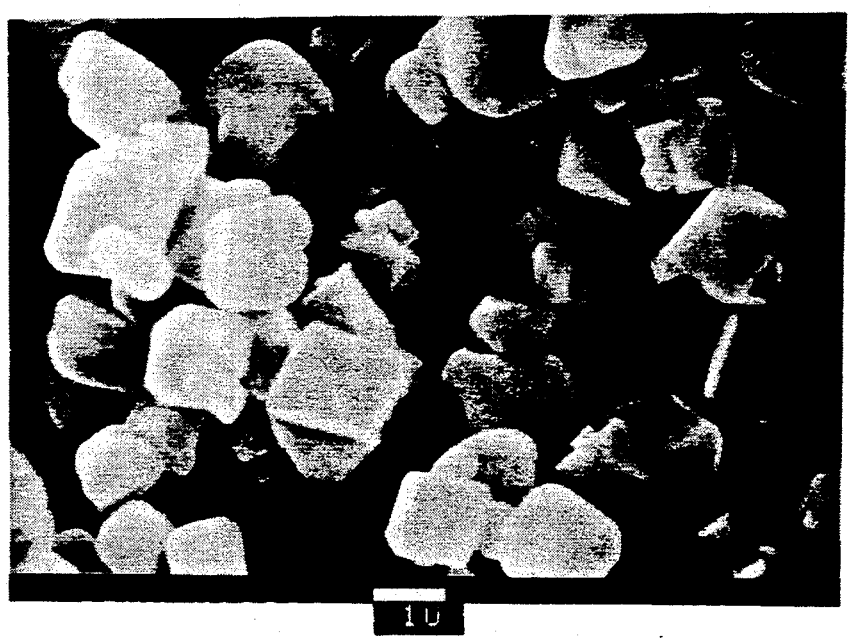
Figure 2F:
FIGS. 2F is a scanning electron microscope photomicrograph, at 10,000 magnification, illustrating the use of a chemically similar but incorrect crystal form of template material.

A photomicrograph of each of the Examples, Nos. 9-15, has been provided as FIGS. 2A-2G, respectively, also noted in Table III. With reference thereto, FIGS. 2A, 2B, 2C, 2D, 2E, 2G and 3B, illustrate the use of a finely divided spinel-structured material ($Fe_3O_4$ or Ferro F-6331 pigment), added to the raw batch material at weight percent levels of 0%, 0.25%, and 2.0%, and 5.0%. FIGS. 2E and 2F illustrate that it is the crystal form of the template material, not its cationic chemical species, which allows it to effect the desired crystal size reduction and improvement of the structure. The additions made to both of these contained approximately the same amount of iron ions. Example No. 13, shown in FIG. 2E, was made with a template material having the desired crystal structure (i.e., spinel). Sample No. 14, shown in FIG. 2F, was made with a template material which did not have the desired structure (this material had a corundum structure).

Figure 2G:
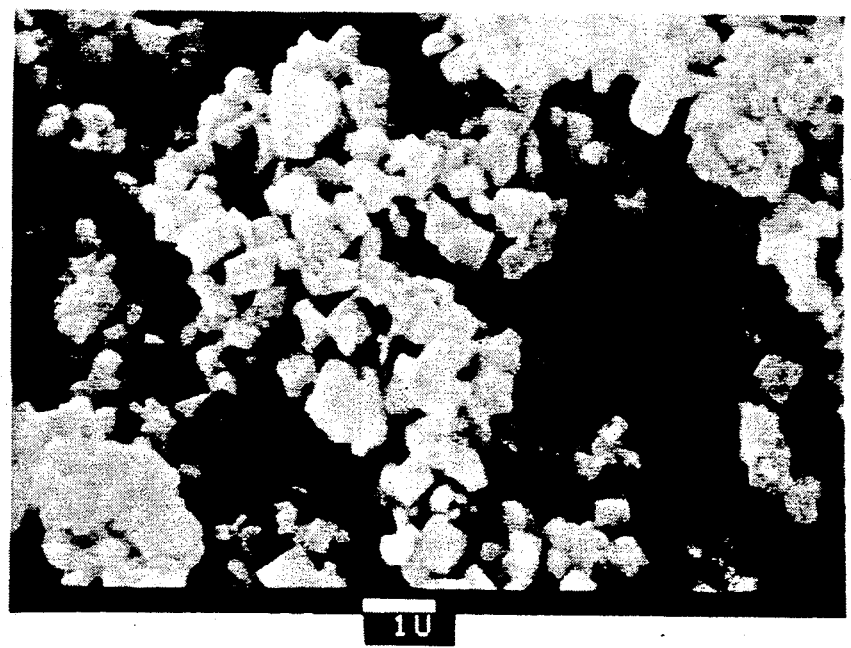

It should also be noted from the photomicrographs. that even a small addition of a template having the same structure as the final pigment both greatly reduced the calcined particle size distribution of the pigment and essentially eliminated the surface defects which would normally occur during the formation of the pigment particles (FIG. 2A-control, Example No. 9). We have also noted that the method of the present invention is not dependent on the static firing of a batch. The same results, production of particles having a controlled particle size, and improving the crystal structure of particles produced during calcination, have been reproduced in material which has been calcined in a rotary furnace. The results of such a trial are depicted in FIG. 2G, for Example No. 15.

ZINC-COBALT SILICATE EXAMPLES

A $(Zn,Co)_2SiO_4$ blue pigment (DCMA class phenacite) was also synthesized according to the present invention. Without the use of a template addition, a small amount of $Co_3O_4$ was found in the calcined product by X-ray powder diffraction. A one percent addition of Ferro Corp. K230B, a zinc cobalt silicate pigment, to the raw batch eliminated the presence of a detectable amount of cobalt oxide in the product. The amount of cobalt oxide in Example No. 16, the standard material, was mimicked by firing Example No. 17 the template-added raw batch, 100° F. (66° C.) lower. Example Nos. 16 and 17 were fired six hours at 2125° F. (1163° C.) and four hours at 2025° F. (1107° C.).

|  | Ex. No. 16 | Ex. No. 17 |
| --- | --- | --- |
| $CoCO_3$ | 58 grams | 58 grams |
| ZnO | 46 grams | 46 grams |
| $SiO_2$ | 46 grams | 46 grams |
| K230B |  | 1.5 grams |

Figure 3A:
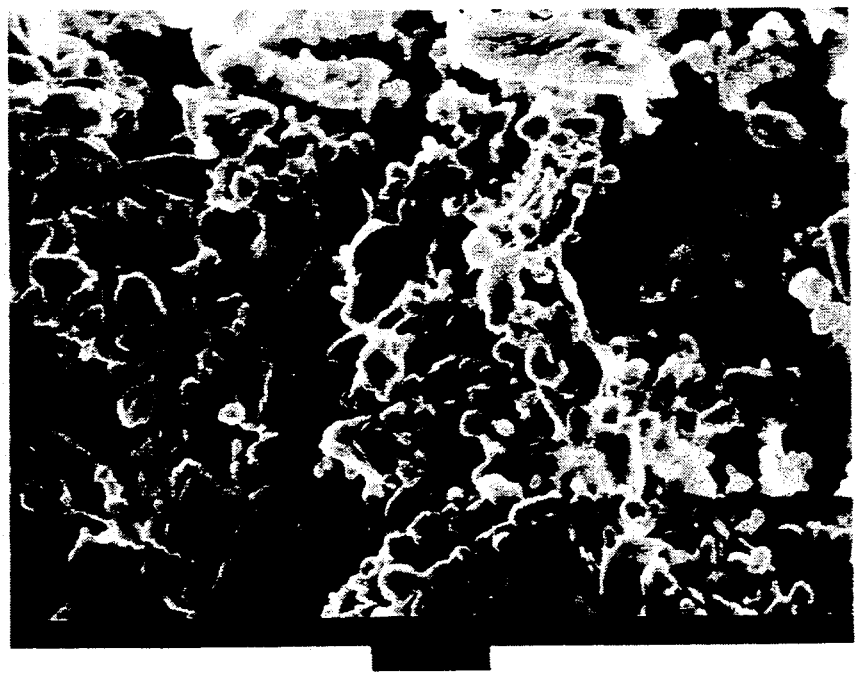
FIG. 3A is a scanning electron microscope photomicrograph, at 5,000 magnification, depicting a zinc-cobalt silicate powder, made in a conventional manner.
Figure 3B:
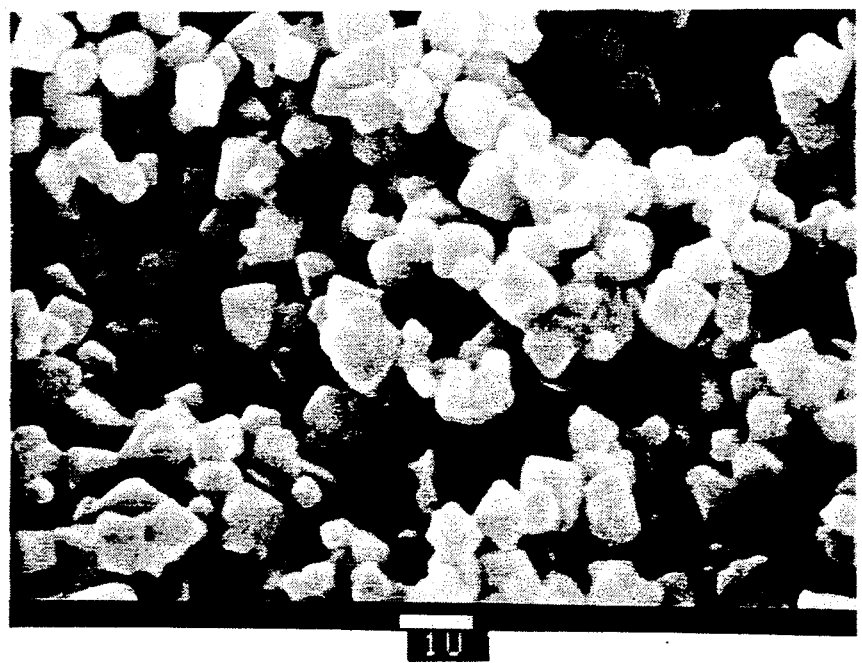
FIG. 3B is a scanning electron microscope photomicrograph, at 5,000 magnification, illustrating the use of a finely divided spinal-structured template material to produce a copper-chromeblack spinal structure made according to the method of the present invention.

Further trials were run using different raw material sources. An SEM photograph of the standard product is shown in FIG. 3A. The standard product, Example No. 18, exhibited extensive necking. Example Nos. 18 and 19 were fired 8 hours at 1900° F. (1038° C.) in covered crucibles.

|  | Ex. No. 18 | Ex. No. 19 |
| --- | --- | --- |
| $Co_3O_4$ | 45 grams | 45 grams |
| ZnO | 53 grams | 53 grams |
| $SiO_2{}^a$ | 53 grams | 53 grams |
| K230B |  | 3 grams |
| $NH_4Cl$ | 1.5 grams | 6 grams |

*Particle size = 5μ*

Based upon the foregoing disclosure, it should now be apparent that the use of the method described herein will carry out the objects set forth hereinabove. As noted hereinabove, the production of competitively priced pigments requires the use of relatively inexpensive raw materials, inexpensive processing steps, minimal labor, and short production processes. Due to these limitations, most pigments are made by the general process of batching, wet or dry blending, calcining, and grinding operations. The raw materials used are fine powders, typically with particle sizes in the range of 0.2 to 50μ. The dry blending process is not primarily used to reduce the particle sizes of the powders, and generally cannot produce raw batches which are homogeneous on the submicron scale. The calcinations are typically 0.1 to 24 hours long to allow for large scale production, which is often insufficient to permit complete diffusion and reaction of the coarser or more refractory raw materials. Grinding is done by a variety of methods, including micropulverization, jet milling, ball milling, attrition milling. The wet grinding methods are followed by either a drying operation or a filter, wash, and dry process.

The present invention helps alleviate one or more of these listed problems for many of the pigment systems. The three most important benefits of the present invention are that the templates can greatly enhance the reaction rates at low temperatures, enabling complete reaction at temperatures as much as 270° F. (150° C.) lower than normal; they provide the ability to control and tune the system to produce the desired particle size and a narrower particle size distribution; and they provide the ability to control the system to produce a desired particulate morphology. The ability to react at lower temperatures is extremely important. It contributes to producing finer particle sizes and reduces aggregation inter-particle necking. It also helps eliminate grit and large particles, and reduces wear and attack on the reaction vessel.

Likewise, the ability to produce desired and/or finer particle sizes is very important. This enhances the pigment quality by enabling production of the optimized particle size with a narrower particle size distribution. It reduces raw material costs by enabling the use of coarser and cheaper raw materials. Finally, it reduces processing costs by enabling use of milder and/or shorter grinding operations.

The ability to control the size, crystallinity and shape of the product by the amount or type of the template used has far reaching implications, including the production of magnetic, conducting, and superconducting or semiconducting media. In the case of mixed metal oxide pigments, the size, crystallinity and shape thereof greatly influence the optical properties of the pigmented system. In addition, the size, crystallinity and shape, together with the presence of crystalline surface defects affect their dissolution rates in glazes and affect the interfacial reactions that occur in all systems. In particular, the rates of interfacial reactions can affect the degradation rates or stability of the paint and plastic systems in which mixed metal oxide powders are used.

A fourth important benefit attributable to the use of templates is that they can also help to minimize or eliminate the formation of phase impurities.

It should also be apparent to those skilled in the art that the method of the present invention can be practiced to manufacture a variety of crystalline powders having utility as pigments for ceramics, plastics and paints as well other uses including in superconductors, semiconductors, ferroelectrics, dielectrics, piezoelectrics, refractories, catalysts, grinding media, abrasives and the like. Similarly, the selection of components to form the crystalline powders as well as selection of a template material can readily be made within the total specification disclosure. Relative amounts of the components can be varied depending upon the compositional and structural (i.e., both morphologic, or shape, and crystal structure) results sought. In addition to the chromophore employed in the case of a pigment composition, crystal size and shape (morphology) and crystal structure are important in producing the desired color. In similar fashion it is to be appreciated that the process steps of the method, including blending, calcination and product recovery are generally conventional, except for the lowering of the reaction temperatures, and thus, can readily be determined by those skilled in the art.

It is, therefore, to be understood that any variations evident fall within the scope of the claimed invention and thus, the selection of specific metal oxides and template materials can be determined without departing from the spirit of the invention herein disclosed and described. Moreover, the scope of the invention shall include all modifications and variations that may fall within the scope of the attached claims.

What is claimed is:

1. A method for the solid state synthesis of mixed metal oxide crystalline powders comprising the steps of:
    preparing a raw material mixture containing at least two different metal cations;
    adding a template material to said mixture and blending it therewith;
    initiating formation of a mixed metal oxide by calcination of said mixture and said template material, whereby particles of the mixed metal oxides are formed in powder form; and
    thereafter recovering said mixed metal oxide particles.

2. A method for the solid state synthesis of mixed metal oxide crystalline powders, as set forth in claim 1, wherein said step of adding a template material includes addition of from about 0.002 to about 20 percent by weight thereof to said mixture.

3. A method for the solid state synthesis of mixed metal oxide crystalline powders, as set forth in claim 2, wherein said step of adding a template material includes addition of up to about 5 percent by weight thereof to said mixture.

4. A method for the solid state synthesis of mixed metal oxide crystalline powders, as set forth in claim 1, wherein said step of initiating formation is conducted by calcining at a temperature of from about 500° F. (260° C.) to about 2500° F. (1343° C.) for about 0.1 to 24 hours.

5. A method for the solid state synthesis of mixed metal oxide crystalline powders, as set forth in claim 1, wherein said metal cations employed in said step of preparing are provided by metal compounds which form pigment classes of material selected from the group consisting of borate, garnet, olivine, phenacite, phosphate, priderite, pyrochlore, sphene, spinel and zircon, as well as perovskite crystal classes of material.

6. A method for the solid state synthesis of mixed metal oxide crystalline powders, as set forth in claim 1, wherein said template materials comprise materials of the same or closely related crystal structure of the desired mixed metal oxide crystalline powders.

7. A method for the solid state synthesis of mixed metal oxide crystalline powders, as set forth in claim 6, wherein said template materials are selected from the group consisting of zircon ($ZrSiO_4$), black iron oxide ($Fe_3O_4$), magnesium aluminate spinel ($MgAl_2O_4$), finely divided spinel-structure pigments, and other finished pigments, crystal structures and materials of the same or closely related crystal structure as the crystal structure of the mixed metal oxide crystalline powder being synthesized, said template materials having a particle size ranging from about 0.01 to about $50\mu$.

8. A method for the solid state synthesis of mixed metal oxide crystalline powders, as set forth in claim 1, wherein said material is zircon.

9. A method for the solid state synthesis of mixed metal oxide crystalline powders, as set forth in claim 1, wherein said material is a spinel.

10. A method for the solid state synthesis of mixed metal oxide crystalline powders, as set forth in claim 1, wherein said material is a phenacite.

* * * * *